United States Patent
Williams et al.

(10) Patent No.: US 7,036,522 B2
(45) Date of Patent: May 2, 2006

(54) SOLENOID ACTUATED PNEUMATIC VALVE WITH AN INTEGRATED PASS-THROUGH AND A QUICK MOUNT BODY

(75) Inventors: Kevin C. Williams, Wixom, MI (US); Robert H. Neff, Bloomfield Village, MI (US)

(73) Assignee: MAC Valves, Inc., Wixom, MI (US)

(*) Notice: Subject to any disclaimer, the term of this patent is extended or adjusted under 35 U.S.C. 154(b) by 259 days.

(21) Appl. No.: 10/643,667

(22) Filed: Aug. 19, 2003

(65) Prior Publication Data

US 2005/0040355 A1 Feb. 24, 2005

(51) Int. Cl.
*F16L 5/00* (2006.01)

(52) U.S. Cl. ............... 137/356; 137/625.65; 403/325; 403/327; 24/458

(58) Field of Classification Search ............... 137/343, 137/356, 625.65, 625.27, 883; 403/325, 403/327, 329; 24/457, 458
See application file for complete search history.

(56) References Cited

U.S. PATENT DOCUMENTS

| | | | |
|---|---|---|---|
| 4,524,797 A * | 6/1985 | Lungu | 137/343 |
| 4,896,700 A | 1/1990 | Stoll | 137/884 |
| 5,429,225 A | 7/1995 | Schiesser et al. | 198/781.06 |
| 5,457,594 A | 10/1995 | Stoll et al. | 361/160 |
| 5,540,323 A | 7/1996 | Schiesser et al. | 198/781.06 |
| 5,765,589 A | 6/1998 | Stoll et al. | 137/271 |
| 5,967,188 A * | 10/1999 | Chien-Chuan | 137/883 |
| 6,269,834 B1 | 8/2001 | Huhnen | |
| 6,301,113 B1 * | 10/2001 | Guerrero | 361/704 |
| 6,302,266 B1 | 10/2001 | DeFrancisco et al. | 198/781.06 |
| 6,700,232 B1 * | 3/2004 | Rieck et al. | 310/23 |
| 2002/0067100 A1 * | 6/2002 | Rieck et al. | 310/254 |
| 2003/0030021 A1 | 2/2003 | Hawkins et al. | |

FOREIGN PATENT DOCUMENTS

| | | |
|---|---|---|
| DE | 1211453 | 2/1966 |
| DE | 19743949 | 11/1998 |
| EP | 0365146 | 4/1990 |

OTHER PUBLICATIONS

European Search Report, dated Nov. 17, 2004 (3 pgs).

* cited by examiner

*Primary Examiner*—Edward K. Look
*Assistant Examiner*—John K. Fristoe, Jr.
(74) *Attorney, Agent, or Firm*—Harness, Dickey & Pierce, P.L.C.

(57) ABSTRACT

A solenoid actuated pneumatic valve assembly including a valve body having a pressurized air supply inlet port in fluid communication with a source of pressurized air, an outlet port adapted to be in fluid communication with at least one active pneumatically operated device, and a pass-through port. The pass-through port is adapted to be in fluid communication with and provide a pass-through of the supply of pressurized air to the inlet port of at least one other valve assembly such that the valves are mounted in series with respect to the supply of pressurized air. A latching assembly is also provided that is supported upon the valve body and is adapted to engage and be operatively retained within an aperture in a mounting plate.

17 Claims, 8 Drawing Sheets

SOLENOID ACTUATED PNEUMATIC VALVE WITH AN INTEGRATED PASS-THROUGH AND A QUICK MOUNT BODY

BACKGROUND OF THE INVENTION

1. Field of the Invention

The invention relates, generally, to solenoid actuated pneumatic valve assemblies and, more specifically, to a pneumatic valve having an integrated pass-through to allow the valve to be placed in series with other like valves and a quick mount body adapted to allow for rapid removal and replacement of the valve without fasteners.

2. Description of the Related Art

Pneumatic valve assemblies are well known in the art for controlling the flow of pressurized air to and from various pneumatically actuated devices such as linear actuators, rotary actuators, air outlets or any other pneumatic device or application requiring precise control of operating air. One common use of pneumatic valve assemblies includes using a series of individual valves to operate a conveyor system or to perform separate functional activities along a conveyor or an assembly line. In this manner, the individual valves are arranged along the manufacturing process to actuate mechanical devices that may move or index an object into a precise location, for example. The valves may also control activities such as the opening and closing of a sorting chute or a mechanical process such as bottle capping. In configuring a pneumatically supported process along a conveyor system or an assembly line or other operation, often the pneumatically controlled steps or activities are separated into zones. Each of the zones are usually controlled by a separate pneumatic valve assembly.

The individual pneumatic valve assemblies typically include a valve member supported within a valve body that is movable between predetermined positions. These positions are typically defined by the placement of valve seats within the valve bore. The valve member has valve elements that engage the seats. The valve member is moved between the predetermined positions by an actuator. The actuator may include an electromechanical device, such as a solenoid, that moves the valve member in one direction. The valve assembly may also include a biasing member, such as a coiled spring, or even another electromechanical actuating device that moves the valve member in the opposite direction. In this way, the flow of pneumatic pressure within the valve is controlled between various ports formed in the valve body.

Depending on how the valve body is configured internally, the valve may be constructed in either a "normally open" or a "normally closed" configuration, in reference to the initial state of the flow passage from the inlet port to the outlet port of the valve assembly. Additionally, there are known valve assemblies having two, three, or four-way valve flow paths that can provide multiple internal pneumatic flow paths between a number of inlet and outlet ports. This allows the valve body to be configured to provide some ports as "normally open" and some as "normally closed", depending on the application. However, when employed as a control device for a zone in a process system as described above, the valve assembly is typically a "normally closed", three-way valve having one supply port connected to a source of pressurized air, one outlet port that is opened when the valve is actuated to supply pressure to the active device, and an exhaust port that vents the applied pressure when the valve returns to its closed position.

Additionally, valve assemblies that control zones of a process all require a source of pressurized air. While not the most efficient, this can obviously be accomplished by running individual pressurized supply lines to each valve. If space is limited, then the valve assemblies are often arranged on some type of manifold that collectively supplies pressurized air to each valve. It is also known to utilize a number of pneumatically connected manifolds, with each manifold supporting valve assemblies that are in close proximity to each other. Finally, some applications avoid the use of manifolds or the use of individual pressurized air lines to each valve by employing valve assemblies that have a "pass-through" of pressurized air. In this case, the valves are connected in series with regard to each other and the source of pressurized air. In other words, they sequentially provide a source of pressurized air to each other by being in pneumatic series through their pass-through connections. These series-connected valve assemblies can then be mounted in close proximity to the zone they control thus avoiding long runs of multiple pneumatic conduits from the valve to each active device. Each of the series-connected valves are typically mounted by fastening the individual valve assemblies to a mounting plate or attachment surface that is part of the conveyor system or assembly line frame.

Over the years, there have been a number of improvements in this field that have produced solenoid actuated valve assemblies having high flow rates with repeatable, fast response times. These improvements have provided greater productivity in the control of production processes. Yet, as faster and smaller valves have evolved, certain limitations and drawbacks to the use of these conventional valve assemblies have become apparent. Certain high-speed manufacturing and process environments perform repetitive pneumatically driven operations in extremely high numbers over a relatively short period of time. For example, over the course of a year, many of the above-mentioned applications require that these types of pneumatic valves perform millions of repetitive actuations.

All valve assemblies currently employed in the related art are subject to wear and durability limitations when used in rigorous environments that require high-speed, and high-repetition valve operation. Wear and ultimate failure of these valve assemblies is expected. When a failure occurs, the valve is removed and replaced. It is also generally expected that these failures will cause production shut downs while the valve in question is replaced. Depending on the application, the economic loss of the process down time is dealt with in a number of ways. For example, time maybe allocated for scheduled periods of maintenance, where the system is taken off-line and failing or weak valves are replaced. However, many applications run their processes 24 hours a day and scheduled maintenance periods are invasive to the process and time consuming. In these "always on" operations, it can make more economic sense to just run the equipment until a failure occurs to achieve maximum life from each of the components, then deal with the replacement of the failed parts as they occur. In any event, the conventional solenoid operated valve assemblies require costly amounts of down-time to remove and replace. Partly in response to this problem, removable solenoids have been developed in the related art. In this case, the solenoid is retained to the valve body by as little as two fasteners. If just the solenoid fails, this type of attachment allows for a quick solenoid change while leaving the valve body in the system. Depending on the design of the valve, this may also avoid the loss of pressure to the valve in question and to the other valves in series. However, even with readily replaceable solenoids, there is still room for improvement in reducing the down-time required to remove and replace these types of valve assemblies.

The current valve assemblies used in these type of processes are fixed to a mounting plate or attachment surface with any number of fasteners. Furthermore, the pressurized connections at their inlet, outlet, and pass-through require the use of known, conventional types of threaded fasteners that do not lend themselves to quick mounting or replacement. This can lead to even longer down time during maintenance, especially where a number of valves in a given zone are involved. Thus, removal and replacement times for conventional valves employed in these types of process systems is still excessive as it requires a number of hand tools and a moderate amount of physical manipulation to complete. Therefore, there remains a need in the art for a solenoid actuated pneumatic valve assembly that overcomes these deficiencies by providing the ability to be rapidly and readily removed and replaced in these types of operating environments.

SUMMARY OF THE INVENTION

The present invention overcomes the disadvantages and drawbacks of the conventional related art by providing a solenoid actuated pneumatic valve assembly. The valve assembly includes a valve body having a pressurized air supply inlet port in fluid communication with a source of pressurized air, an outlet port adapted to be in fluid communication with at least one active pneumatically operated device, and a pass-through port. The pass-through port is adapted to be in fluid communication with and provide a pass-through of the supply of pressurized air to the inlet port of at least one substantially similar valve assembly such that the valves are mounted in series with regard to the supply of pressurized air. A latching assembly is also provided that is supported upon the valve body and is adapted to engage and be operatively retained within an aperture in a mounting plate without the use of fasteners. Thus, the present invention provides a solenoid actuated pneumatic valve assembly that can quickly and easily be removed or installed and is mountable in series with other like valves.

BRIEF DESCRIPTION OF THE DRAWINGS

Other advantages of the invention will be readily appreciated, as the same becomes better understood by reference to the following detailed description when considered in connection with the accompanying drawings, wherein.

DETAILED DESCRIPTION OF THE PREFERRED EMBODIMENT(S)

Figure 1:
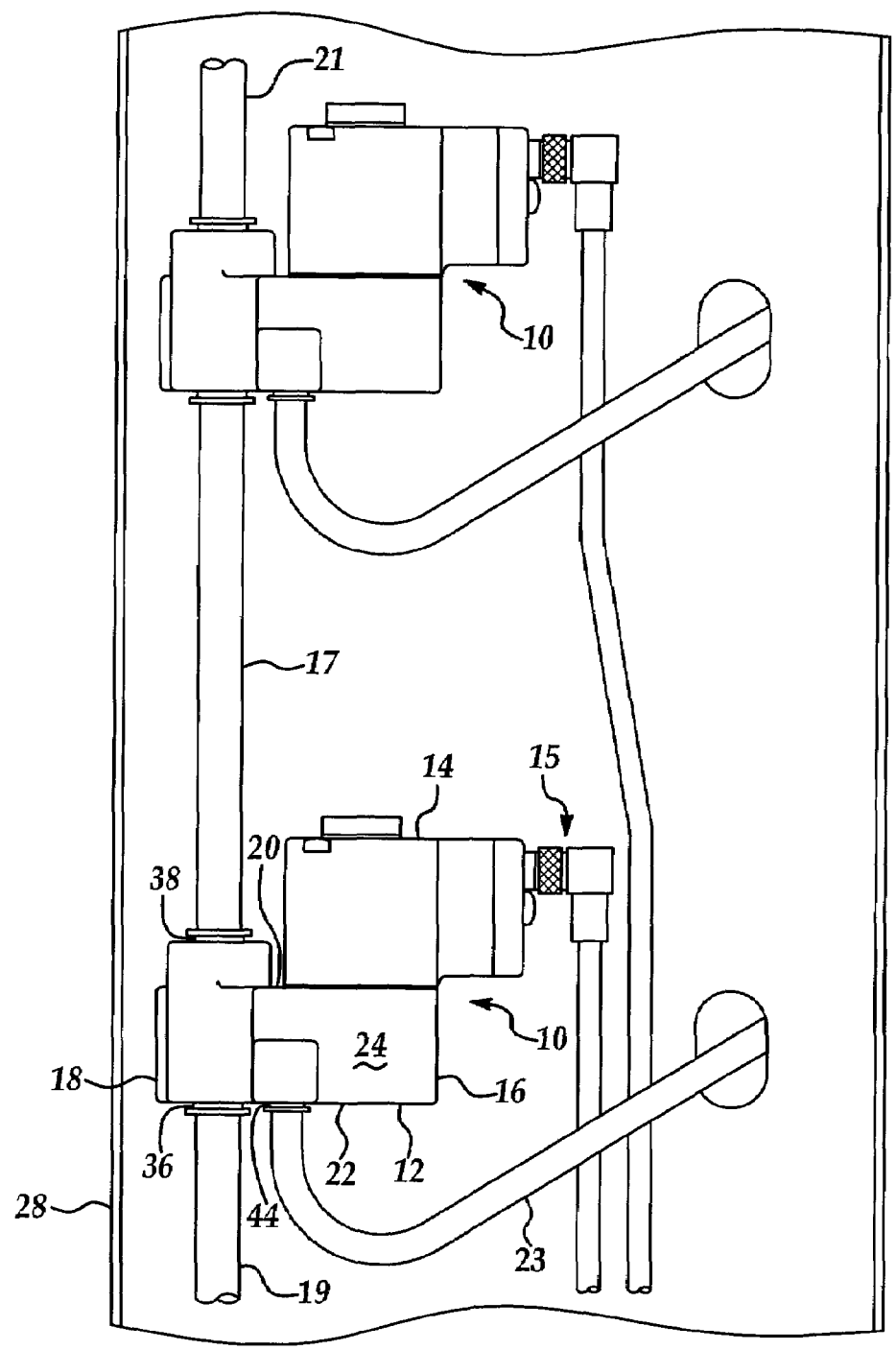
FIG. 1 is an environmental side view of two valve assemblies of the present invention mounted to a mounting plate of a larger process apparatus and connected in series to a source of pressurized air.

Referring now to the figures, where like numerals are used to designate like structure throughout the drawings, a pneumatic valve assembly of the present invention is generally indicated at 10 and 210. As shown in FIG. 1, two valve assemblies 10 of the present invention are pneumatically interconnected in series with a source of pressurized air. Each of the valve assemblies 10 includes a valve body 12 and an electromagnetic actuator assembly, such as a solenoid, generally indicated at 14 and mounted to the valve body 12. The valve body 12 has a thin rectangular shape defining top and bottom surfaces 16, 18, respectively, a pair of opposed side surfaces 20, 22 extending between the top and bottom surfaces 16 and 18 and end surfaces 24, 26. The actuator assembly 14 is mounted to the side surface 20 of the valve body 12. The actuator of the present invention may be of any known type typically used in pneumatic valves such as an electromagnetic solenoid having a floating armature with lost-motion biasing as described in prior art U.S. Pat. Nos. 4,438,418 or 3,538,954, the disclosures of which are incorporated herein by reference. Thus, those having ordinary skill in the art will appreciate from the description that follows that the exact form of the actuator, whether electromagnetic or otherwise, forms no part of the present invention. The actuator 14 is in electrical communication with a control device through a wiring harness as generally indicated at 15 in FIG. 1.

The valve body 12 is adapted to be mounted to an attachment, or mounting plate 28. It should be appreciated that the mounting plate 28 is in some manner affixed to a processing device, a conveyor system, or some other larger mechanism that requires the controlled application of pneumatic pressure as supplied by the valve assemblies of the present invention. More specifically, the placement of the mounting plate 28 and the general placement of the valve assemblies 10 on the mounting plate 28 is driven entirely by the overall design of the greater device or system. Thus, the two valve assemblies 10 as illustrated in FIG. 1 are shown in close proximity for the purpose of discussion and may or may not be so closely located in operation.

Referring now to FIGS. 2A through 3B, the valve body 12 includes a pressurized air supply inlet port 30 in fluid communication with a source of pressurized air, an outlet port 32 adapted to be in fluid communication with at least one active pneumatically operated device, and a pass-through passage 34 adapted to be in fluid communication with and provide a pass-through of the supply of pressurized air to the inlet port of a substantially similar valve assembly 10 such that the valves are mounted in series with regard to the supply of pressurized air. More specifically, the pass-through passage 34 is a bore that extends through the valve body 12 and has a pass-through inlet 36 and a pass-through outlet 38. The pass-through inlet and outlet 36 and 38 each include a "quick connect" fitting generally indicated at 40, which will be discussed in greater detail below. The outlet port 32 also has "quick connect" fitting generally indicated at 42 disposed in the outlet opening 44. The pneumatic connection of one valve assembly 10 to a second valve assembly 10 can be seen in FIG. 1 where the valves are in fluid communication with each other through a piece of pneumatic conduit, or tubing 17. As shown in FIG. 1, the source of pressurized air is supplied through tubing piece 19 to the pass-through inlet 36 of the first valve assembly 10. The pressurized air then passes through the pass-through passage 34 of the first valve 10 and out the pass-through outlet 38 to the pass-through inlet 36 of a second valve by way of pneumatic tubing 17. Further, the source of pressurized air continues on to another remote valve assembly 10 through tubing 21. The controlled output of pressurized air from the outlet 44 of valve assembly 10 is delivered to the actively control pneumatic device by way of tubing 23.

A valve bore 46 extends axially through the valve body 12. In the embodiment illustrated here, the pneumatic valve assembly 10 is a two-way valve and also includes an exhaust port 48 in fluid communication with the valve bore 46. In the embodiment illustrated in the figures, the valve bore 46 extends completely through the valve body 12 to present a pair of open ends 50, 52. A valve member, generally indicated at 54, is movably supported within the valve bore 46 between predetermined positions to selectively direct a flow of pressurized air from the inlet port 30 through the valve bore 46 to the outlet port 32. Concomitantly, the valve member 54 also selectively directs pressurized air to vent from the outlet port 32 to the exhaust port 48, as will be described in greater detail below. An end retainer insert, generally indicated at 56 is received in the open end 52 of the valve body 12, thereby retaining the valve member 54 within the valve bore 46 as will be described in greater detail below.

Figure 2A:
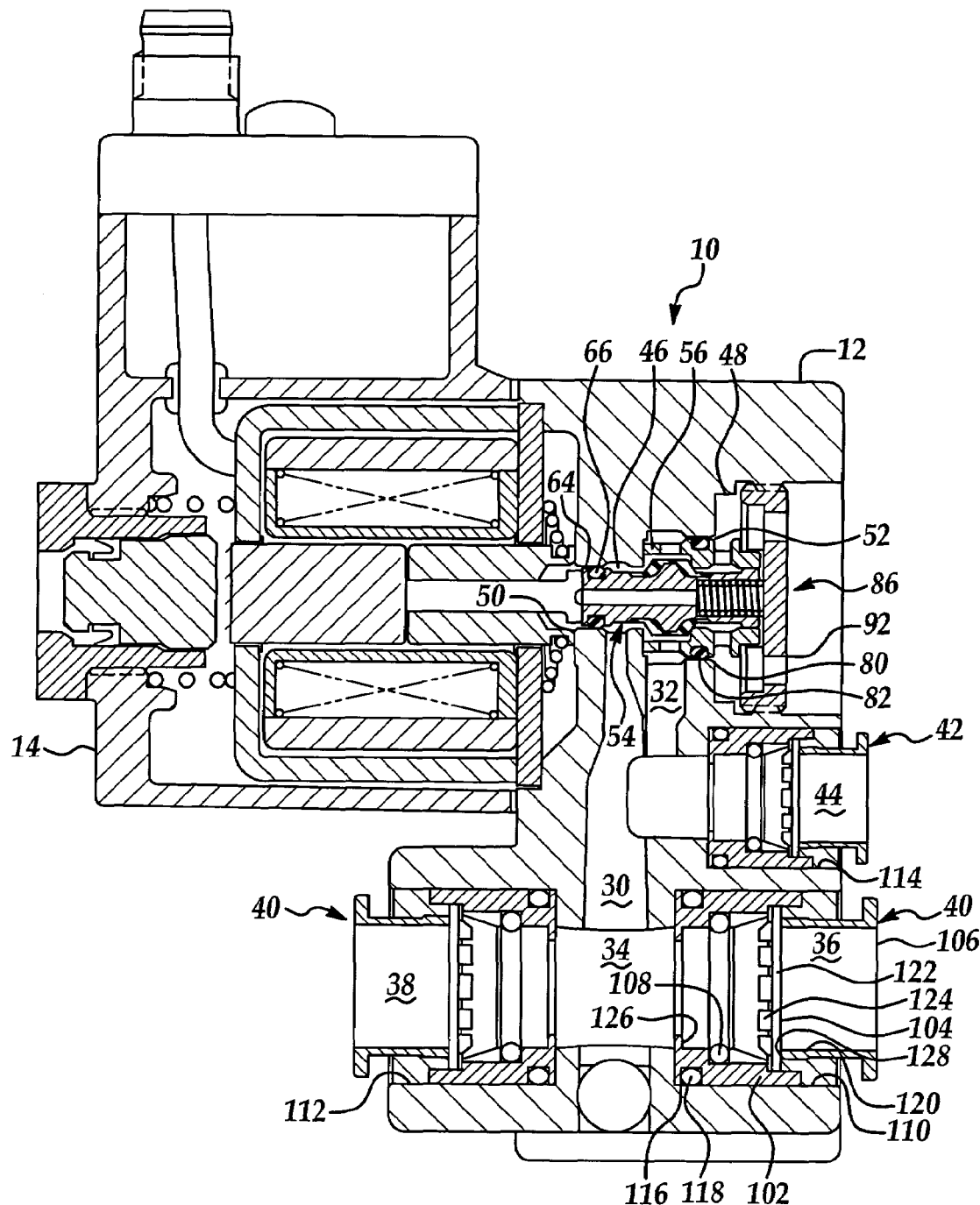
FIG. 2A is a cross-sectional view of the embodiment of the valve assembly illustrated in FIG. 1 having a side mounted solenoid actuator.
Figure 2B:
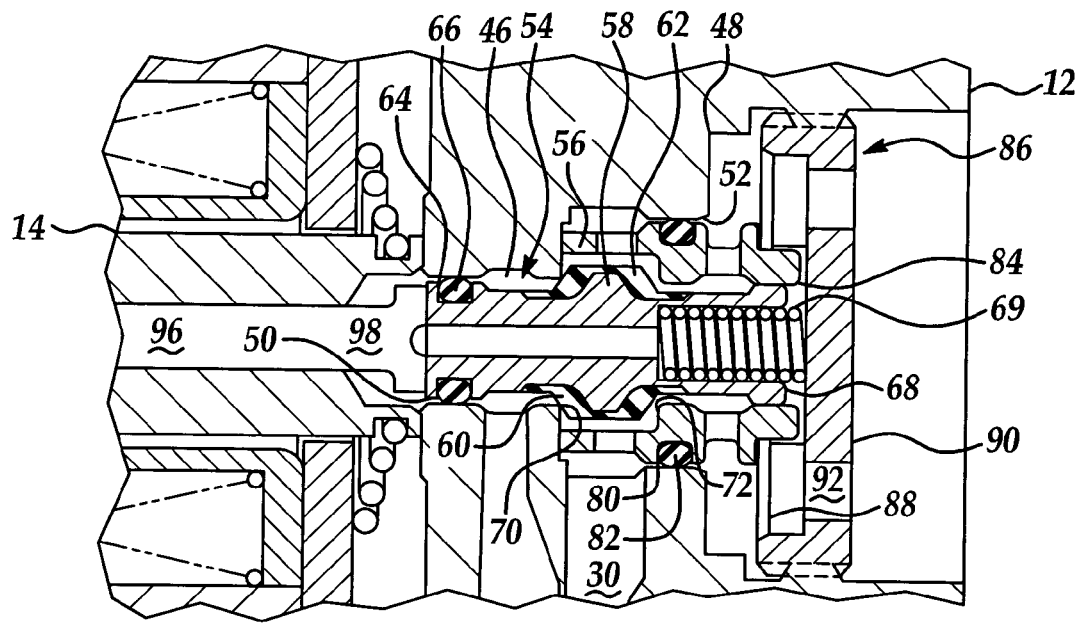
FIG. 2B is a partial cross-sectional view of the embodiment of the valve assembly illustrated in FIG. 2A with the actuator in the de-energized position such that the valve is closed.
Figure 2C:
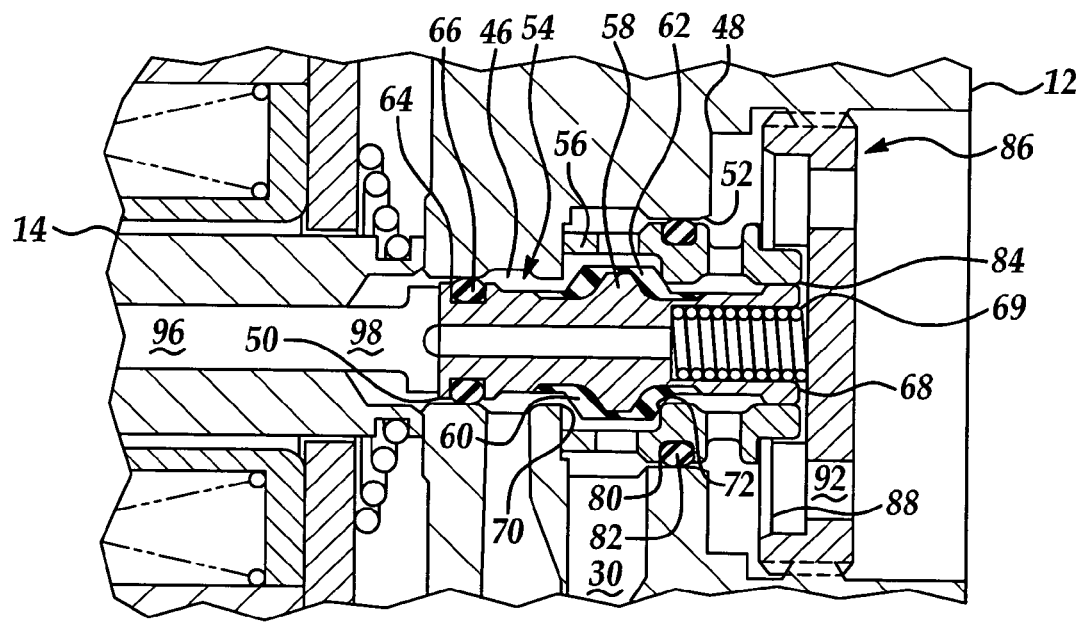
FIG. 2C is a partial cross-sectional view of the embodiment of the valve assembly illustrated in FIGS. 2A and 2B with the actuator in the energized position such that the valve is open.

The valve member 54 further includes a valve element 58 disposed along its length. The valve element 58 is formed on the valve member 54 and has valve sealing surfaces 60 and 62 that are operable to selectively direct a flow of pressurized air from an inlet port 30 through the valve bore 36 to the outlet port 48 and from the outlet port 32 to the exhaust port 48, respectively. As shown in FIGS. 2A through 2C, the valve member 54 further includes an annular groove 64 that receives an o-ring type seal 66, which slidingly engages the open end 50 of the valve bore 46 to prevent leakage of the pressurized air from the valve bore 46. The valve member 54 also includes a cup-shaped recess 68 that accepts and retains a biasing member 69.

In the preferred embodiment, the valve member 54 is an aluminum insert that is over-molded with a suitable resilient material such as rubber, or any known elastomer, in the appropriate place. More specifically, it should be appreciated by those having ordinary skill in the art that the material of the sealing surface may be made of any known composition that is slightly yielding, yet highly resilient, such as nitrile, which may be bonded, or over-molded to the valve member 54.

As shown in FIGS. 2A and 2B, the valve seat 70 is disposed directly in the valve bore 46 itself, while valve seat 72 is disposed in the end retainer insert 52. The end retainer insert 52 includes an annular groove 80, which receives an o-ring type seal 82 to prevent leakage of the pressurized air within the valve bore 46. The end retainer insert 52 has a central bore 84 that receives the valve member 54 and allows it to slidingly move within the valve body 12. The end retainer insert 52 is secured in the valve body 12 by the exhaust port diffuser assembly, which is generally indicated at 86. The diffuser assembly 86 includes a diffuser plate 88 and a retainer 90. Exhaust openings 92 are formed in the retainer 90 so that as pressurized air is allowed to enter the exhaust port 48 it passes through the diffuser plate 88 and through the exhaust openings 92 to the atmosphere. The diffuser plate 88 is a membrane that allows air to pass but prevents foreign objects from entering the exhaust port 48. The retainer 90 of the diffuser assembly 86 is threadably inserted in the valve body 12, so that the diffuser assembly 86 is in contact with and thus secures the end retainer insert 52 in the valve body 12. The diffuser assembly 86 is also in contact with one end of the biasing member 69. The biasing member 69 is disposed in the cup-shaped recess 68, which is formed in one end of the valve member 54, such that the biasing member 69 provides a force operative to move the valve member 54 away from the diffuser assembly 86 in opposition to a force generated by the actuator assembly 14. The biasing member 69 may be a coiled spring or the like.

In operation, the valve seats 70 and 72 cooperate with the valve elements 60 and 62, respectively, to seal the various passages in the valve body 12. The valve seat 70 provides a sealing contact with the valve sealing surface 60 of the valve element 54 when the valve member 46 is in the de-energized position (FIG. 2A) thereby interrupting the flow of pressurized air to the outlet port 32. While in this position, the valve sealing surface 62 is moved away from valve seat 72, so that the outlet port 32 is open to and in fluid communication with the exhaust port 48. This allows any pressurized air in the outlet to be vented to the atmosphere through the exhaust port 48. Likewise, the valve sealing surface 60 is moved away from valve seat 70 when the valve member 46 is in an energized position, thereby allowing the flow of pressurized air from the inlet port 30 to the outlet port 32. While in this position, the valve seat 72 provides a sealing contact with the valve sealing surface 62 of the valve element 54 so that the outlet port 32 is closed off from the exhaust port 48 and pressurized air from the inlet port 30 is delivered to the outlet port 32.

In the preferred embodiment, the actuator assembly 14 is mounted upon the valve body 12 so as to engage and thereby actuate the valve member 54. As shown for illustration purposes only, this may be accomplished by the use of an actuator pushpin 96 having an enlarged head 98 that contacts the end of the valve member 54 opposite the biasing member 69. In this manner, the actuator assembly 14 is operable to move the valve member to the right, as illustrated in FIG. 2A-2C, thereby actuating the valve assembly 10. It should be appreciated by those having ordinary skill in the art that the specific actuating means used to provide motive force to the valve member 54 lies beyond the scope of the present invention. Accordingly, it should be further appreciated that any number of different types of actuating elements, rather than a push pin, may be employed based on the actuating means used. As previously mentioned, the actuator assembly 14 is used to selectively actuate the valve member 54 within the valve bore 46 in the direction opposite to the biasing force of the biasing member 69. In this manner, the actuator assembly 14 drives the valve member to the right, as shown in FIG. 2C, and the biasing member 69 returns the valve member 54 to its original position (to the left, in FIG. 2B) when the actuator assembly 14 is deactivated.

In the preferred embodiment, the actuator assembly 14 is mounted to the valve body 12 by the use of two threaded fasteners 100 (FIG. 3B) that allow for the rapid removal and replacement of the actuator assembly 14 from the valve body 12 without having to depressurize the system. It should be appreciated that various other means of attaching the actuating assembly 14 to the valve body 12 are available that provide a like rapid removal and replacement feature. As such, any other known manner of like actuator attachment may be employed without departing from the scope of the invention.

The quick connect fittings 40 and 42 are of a known type of "push-in locking connector" for pneumatic tubing having a main body 102, a locking collar 104, a release sleeve 106, and an o-ring seal 108. The valve body 12 includes fitting bores 110 and 112 that are each formed to receive the main body 102 of the fittings 40. Similarly, the valve body includes a fitting bore 114 to receive fitting 42, which is substantially similar but of slightly smaller size. The main body 106 of the fitting may be retained in the fitting bore by one of any various known methods. For example, the main body 106 of the fitting and the fitting bores 110, 112, and 114 may be a close tolerance fit in which the fittings 40, 42 are pressed into the bores. Each of the main bodies 110 of the fittings 40 include an externally formed groove 116 that retains an o-ring type seal 118 that seals the main bodies 106 to the bores 110, 112, and 114.

In each of the fittings 40, 42, the release sleeve has an inner diameter 120 that is the approximately the same size as the outer diameter of the tubing that is to be inserted and retained, which provides physical support to the tubing. The locking collar 104 also has an internal diameter 122 that is the approximately the same size as the tubing that is to be inserted and retained. However, the locking collar 104 further includes a plurality of engaging tabs 124 that flexibly extend inwardly from its inner diameter 122. The engaging tabs 124 are also angled away from the opening of the release sleeve 106. In this manner, when a pneumatic tube is inserted into the fitting 40 to provide fluid communication, its end is pushed past the engaging tabs 124 of the locking collar 104 and past the o-ring seal 108 to a stop flange 126. The o-ring seal 108 provides a sealing engagement to the outside diameter of the tube and the plurality of engaging tabs 124 of the locking collar 104 press inward against the outer diameter of the tube. The angle of the engaging tabs 124 thus prevents extraction of the tube from the main body 102 of the fitting 40. The release sleeve 106 is slidingly disposed within the main body 102 so that when it becomes necessary to remove the tube from the fitting 40, the release sleeve 106 is pressed inward relative to the main body 102 so that the forward edge 128 of the release sleeve 106 forces the engaging tabs 124 away from the outer diameter of the tube. The tube is then free to be extracted from the fitting 40, 42.

Figures 3A, 3B:
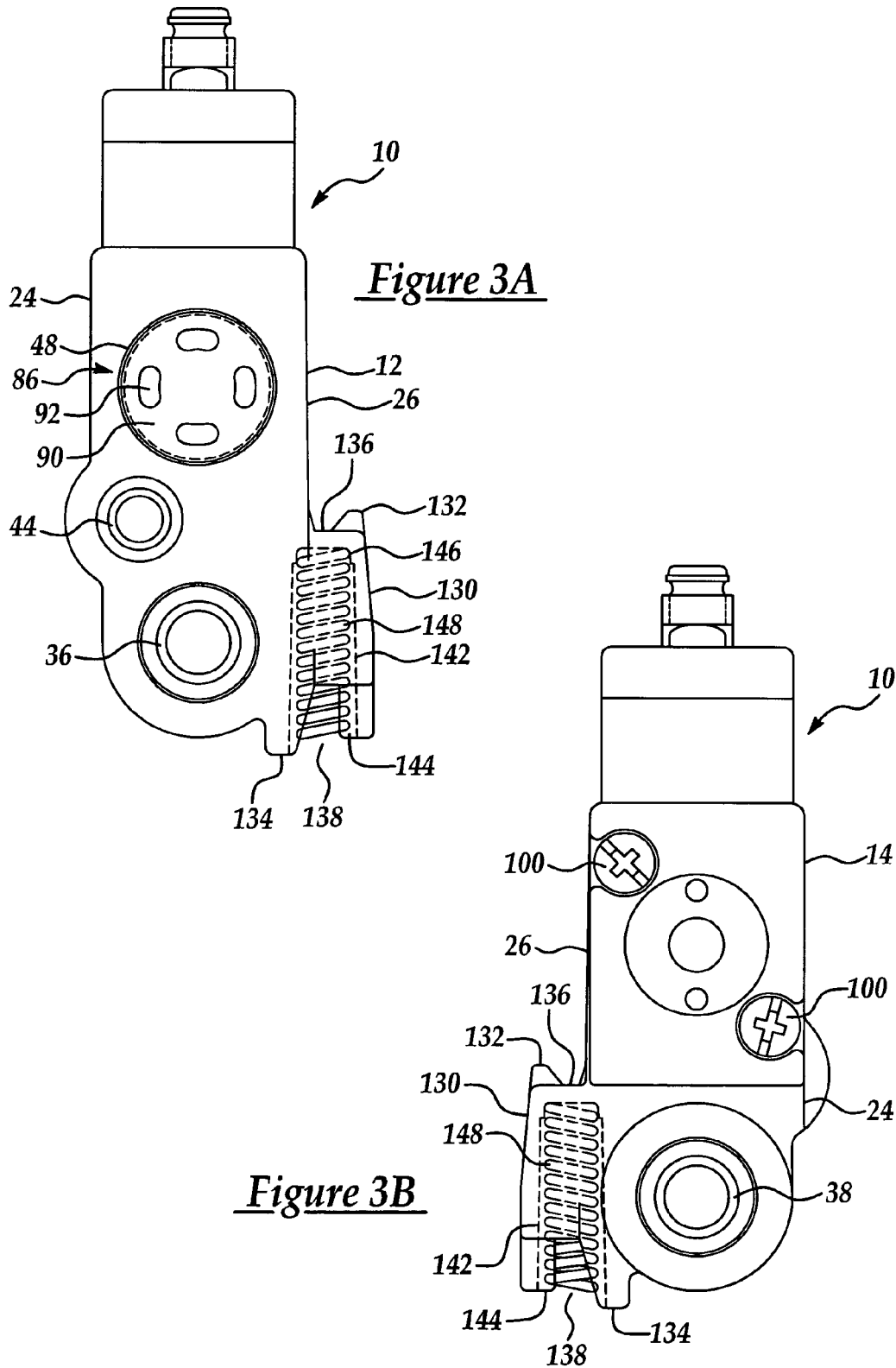
FIG. 3A is a side view of the embodiment of the valve assembly illustrated in FIGS. 2A, 2B, and 2C showing the valve body in detail.
FIG. 3B is an opposing side view of the embodiment of the valve assembly illustrated in FIG. 3A.
Figure 4C:
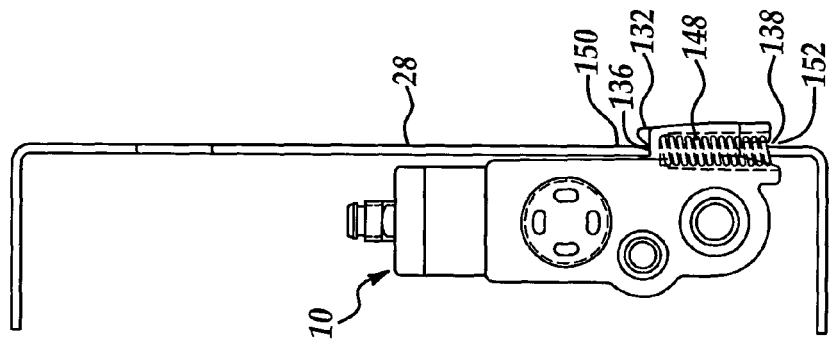
FIG. 4C is a side view of the valve assembly illustrated in FIGS. 4A and 4B showing the quick mount latching assembly in cross-section as the latching assembly is completely inserted into the mounting plate opening and the latching assembly is retaining the valve to the mounting plate.
Figure 4B:
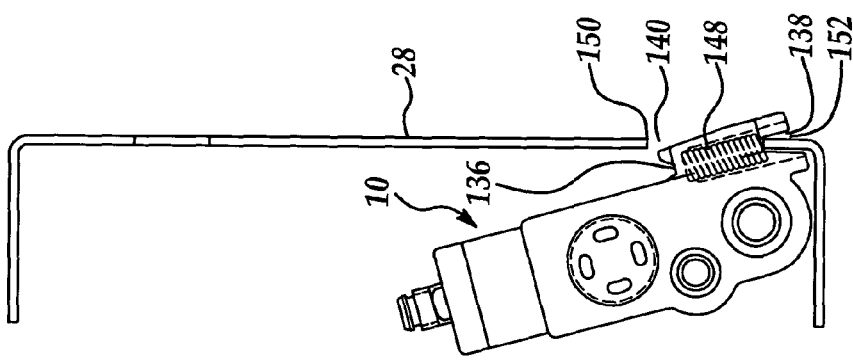
FIG. 4B is a side view of the valve assembly illustrated in FIG. 4A showing the quick mount latching assembly in cross-section as the latching assembly is first inserted into the mounting plate opening.
Figure 4A:
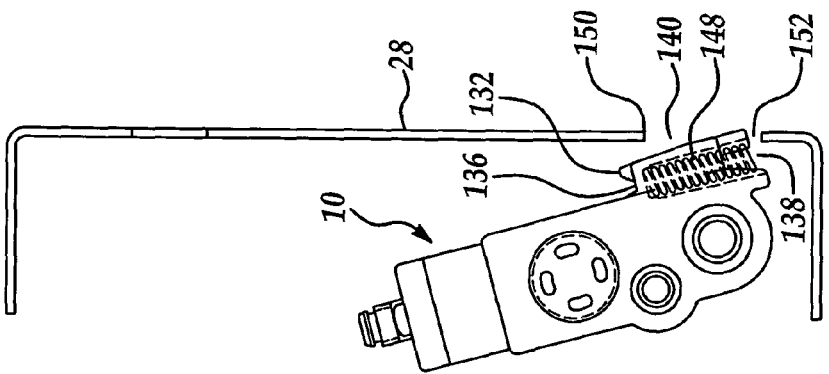
FIG. 4A is a side view of one embodiment of the valve assembly of the present invention showing the quick mount latching assembly in cross-section prior to the insertion of the valve into a mounting plate opening.

As best shown in FIGS. 3A–3B, the valve body 12 also includes a latching assembly 130 that is used to releasably mount the valve body 12 to the mounting plate 28. The latching assembly 130 extends away from the valve body 12 and has a first flanged lip 132 extending laterally outward from the valve body 12 and a second flanged lip 134 disposed opposite to the first flanged lip 132 on the latching assembly 130. The flanged lip 134 also extends laterally outward from the valve body 12. In the preferred embodiment of the present invention, the latching assembly 130 is an integrally formed portion of the valve body 12 that extends away and is spaced apart from the valve body 12. As best shown in FIGS. 4A, 4B, and 4C, the latching assembly 130 is adapted to engage and be operatively retained within an aperture 140 in the mounting plate 28 without the use of fasteners. The first flanged lip 132 defines a first mounting channel 136 that is adapted to accept and retain one side, or upper portion 150 of the aperture 140. The second flanged lip 134 defines a second mounting channel 138 that is adapted to accept the opposite side, or lower portion 152 of the mounting plate aperture 140. In its operative mode, the flanged lips 132, 134 extend beyond the edges of the mounting plate aperture 140 to affix the valve body 12 to the mounting plate without fasteners. In the preferred embodiment of the present invention, the aperture 140 of the mounting plate 28 is formed to have a generally square shape and the latching assembly 130 is formed so that it will fit into the aperture as described in greater detail below.

More specifically, the latching assembly 130 further includes a biasing bore 142 formed within the latching assembly 130. The biasing bore 142 has an open end 144 proximate to the second flanged lip 134 and a closed end 146 proximate to the first flanged lip 132. The biasing bore 142 receives a biasing latch member 148. In the preferred embodiment of the present invention, the biasing latch member 148 is a coiled spring. One end of the biasing latch member 148 is retained at the closed end of the biasing bore 142 while allowing the opposite end of the biasing latch member 148 to extend beyond the second mounting channel 138 to the edge of the second flanged lip 134. Thus, when the valve assembly 12 is installed in the mounting plate 28, the biasing latch member 148 is adapted to provide a biasing force between the edge of the mounting plate aperture at the second mounting channel 138 and the closed end of the biasing bore 146. In this manner, the biasing latch member 148 forces the first mounting channel 136 of the latching assembly 130 upward against the edge of the mounting plate aperture 140 to retain the valve assembly 12 without fasteners.

To attach the valve assembly 10 to the mounting plate 28, the second mounting channel 138 of the latching assembly 130 is directed toward the lower portion of the mounting plate aperture 140, as best shown in FIG. 4A. As shown in FIG. 4B, the second mounting channel 138 is engaged upon the lower portion of the mounting plate aperture 130 and the biasing latch member 148 is compressed until the first flanged lip 132 will clear the upper portion of the mounting plate aperture 140. Then, the valve assembly 10 is rotated back about the second mounting channel 138 so that the first flanged lip 132 passes through the mounting plate aperture 140. Finally, the valve assembly 10 is released so that the biasing latch member 148 forces the valve assembly 10 upward to engage the first mounting channel 136 to the upper portion of the mounting plate aperture 140. Thus, the valve assembly 10 is retained in the mounting plate aperture 140 without the use of fasteners, as shown in FIG. 4C. While the latching assembly 130 and the aperture 140 are illustrated here having a generally square shape, it should be appreciated that the mounting plate aperture 140 and the latching assembly 130 may be formed in any of a variety of different shapes as long as they are cooperatively shaped.

Figure 5A:
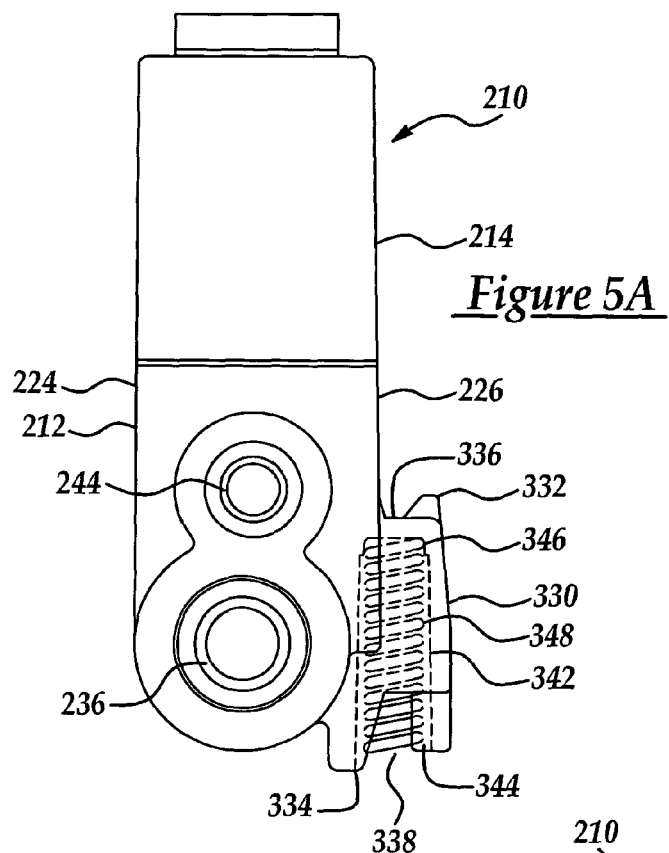
FIG. 5A is a cross-sectional view of the another embodiment of a valve assembly of the present invention having a top mounted actuator with the actuator in the de-energized position such that the valve is closed.
Figure 5B:
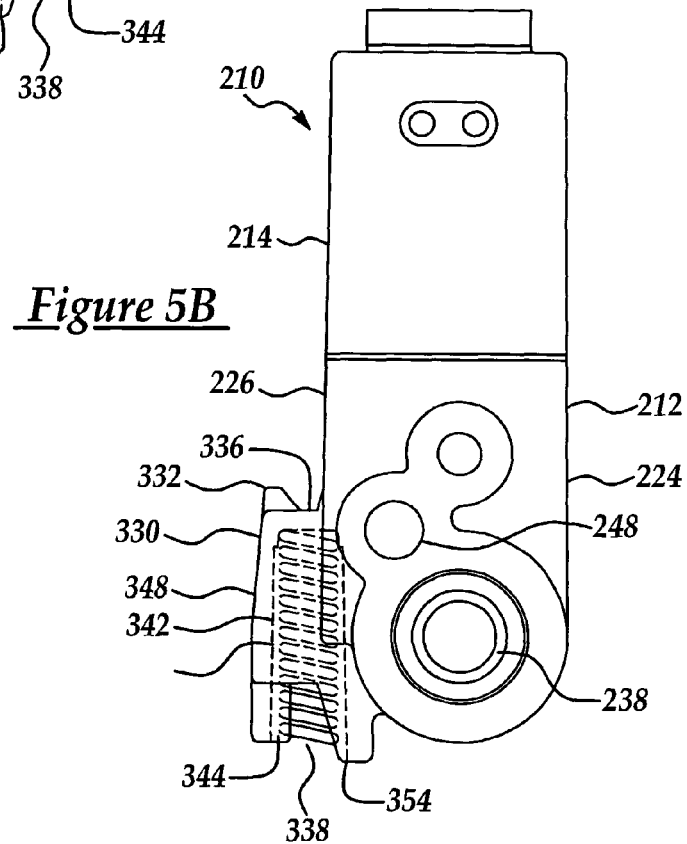
FIG. 5B is a cross-sectional view of the valve assembly illustrated in FIG. 5A having a top mounted solenoid actuator with the actuator in the energized position such that the valve is open.

Another non-limiting embodiment of the valve assembly of the present invention is generally indicated at 210 in FIGS. 5A and 5B, where like numerals indicating like structure with respect to the valve assembly 10 have been incremented by 200. In this embodiment, the valve assembly 210 employs a top mounted actuator. More specifically, the valve assembly 210 includes a valve body 212 and an electromagnetic actuator assembly, such as a solenoid, generally indicated at 214 and mounted to the valve body 212. The valve body 212 has a thin rectangular shape defining top and bottom surfaces 216, 218, respectively, a pair of opposed side surfaces 220, 222 extending between the top and bottom surfaces 216 and 218 and end surfaces 224, 226. The actuator assembly 214 is mounted to the top surface 216 of the valve body 212.

The valve body 212 includes a pressurized air supply inlet port 230 in fluid communication with a source of pressurized air, an outlet port 232 adapted to be in fluid communication with at least one active pneumatically operated device, and a pass-through passage 234 adapted to be in fluid communication with and provide a pass-through of the supply of pressurized air to the inlet port of a substantially similar valve assembly 210 such that the valves are mounted in series with regard to the supply of pressurized air. More specifically, the pass-through passage 234 is a bore that extends through the valve body 212 and has a pass-through inlet 236 and a pass-through outlet 238. The pass-through inlet and outlet 236 and 238 each include a "quick connect" fitting generally indicated at 240. The outlet port 232 also has "quick connect" fitting generally indicated at 242 disposed in the outlet opening 244.

Figure 6A:
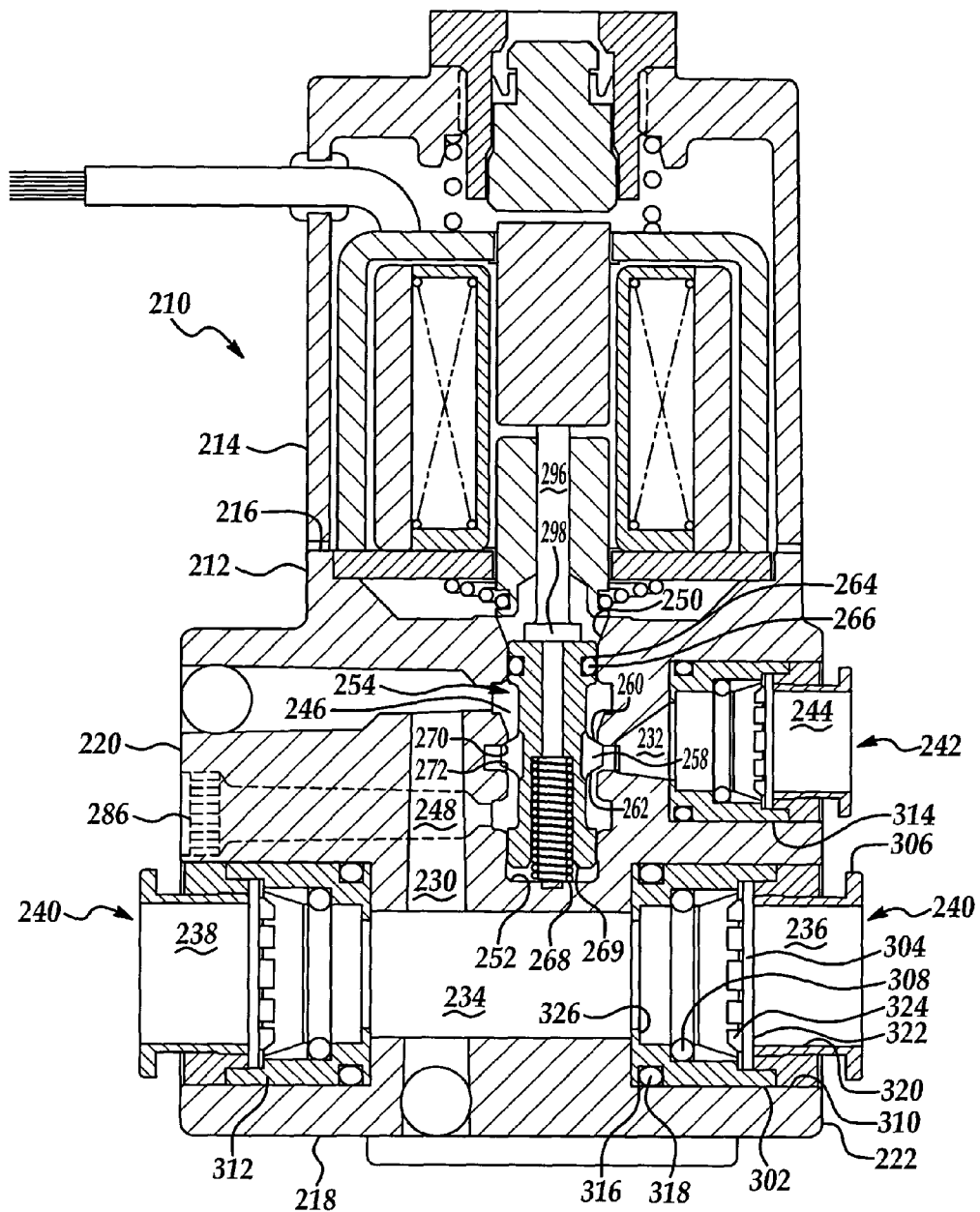
FIG. 6A is a side view of the valve assembly illustrated in FIGS. 5A and 5B having a top mounted solenoid actuator.
Figure 6B:
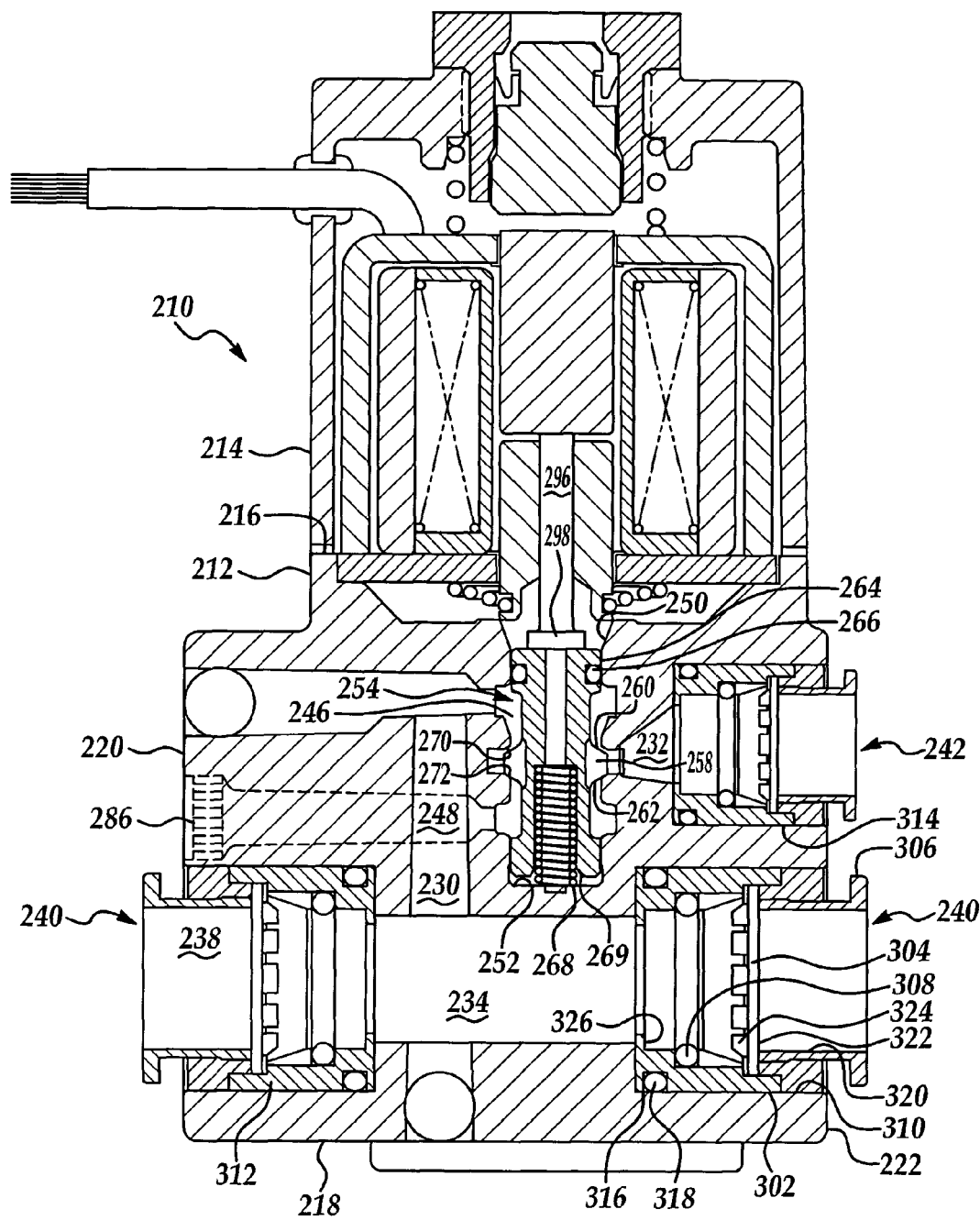
FIG. 6B is the opposing side view of the valve assembly illustrated in FIG. 6A.

As best shown in FIGS. 6A and 6B, a valve bore 246 extends vertically through the valve body 212. In the embodiment illustrated here, the pneumatic valve assembly 210 is a three-way valve and also includes an exhaust port 248 in fluid communication with the valve bore 246. The valve bore 246 extends partially through the valve body 212 to present one open end 250 and a closed end 252. A valve member, generally indicated at 254, is movably supported within the valve bore 246 between predetermined positions to selectively direct a flow of pressurized air from the inlet port 230 through the valve bore 246 to the outlet port 232. Concomitantly, the valve member 254 also selectively directs pressurized air to vent from the outlet port 232 to the exhaust port 248.

The valve member 254 further includes a valve element 258 disposed along its length. The valve element 258 is formed on the valve member 254 and has valve sealing surfaces 260 and 262 that are operable to selectively direct a flow of pressurized air from an inlet port 230 through the valve bore 236 to the outlet port 232 and from the outlet port 232 to the exhaust port 248, respectively. As shown in the figures, the valve member 254 further includes an annular groove 264 that receives an o-ring type seal 266, which slidingly engages the open end 250 of the valve bore 246 to prevent leakage of the pressurized air from the valve bore 246. The valve member 254 also includes a cup-shaped recess 268 that accepts and retains a biasing member 269.

In the preferred embodiment, the valve member 254 is an aluminum insert that is over-molded with a suitable resilient material such as rubber, or any known elastomer, in the appropriate place. More specifically, it should be appreciated by those having ordinary skill in the art that the material of the valve element 258 having sealing surfaces 260 and 262 may be made of any known composition that is slightly yielding, yet highly resilient, such as nitrile, which may be over-molded to the valve member 254.

A biasing member 269 is disposed in the cup-shaped recess 268 formed in one end of the valve member 254 such that the biasing member 269 provides a force operative to move the valve member away from the closed end 251 of the valve bore 246 in opposition to a force generated by the actuator assembly 214. The biasing member 269 may be a coiled spring or the like. In the preferred embodiment, the actuator assembly 214 is mounted upon the valve body 212 so as to engage and thereby actuate the valve member 254. As shown for illustration purposes only, this may be accomplished by the use of an actuator pushpin 296 having an enlarged head 298 that contacts the end of the valve member 254 opposite the biasing member 269. In this manner, the actuator assembly 214 is operable to move the valve member 254 down as seen in FIG. 6B, thereby actuating the valve assembly 210. It should be appreciated by those having ordinary skill in the art that the specific actuating means used to provide motive force to the valve member 254 lies beyond the scope of the present invention. Accordingly, it should be further appreciated that any number of different types of actuating elements, rather than a push pin, may be employed based on the actuating means used. As previously mentioned, the actuator assembly 214, as previously mentioned, is used to selectively actuate the valve member 254 within the valve bore 246 in the direction opposite to the biasing force of the biasing member 269. In this manner, the actuator assembly 214 drives the valve member down, as shown in FIG. 6B, and the biasing member 269 returns the valve member 254 to its original position (upward, in FIG. 6A) when the actuator assembly 214 is deactivated.

In operation, the valve seats 270 and 272 cooperate with the valve sealing surfaces 260 and 262, respectively, to seal the various passages in the valve body 212. The valve seat 270 provides a sealing contact with the valve sealing surface 260 of the valve element 258 when the valve member 254 is in the de-energized position (FIG. 5A) thereby interrupting the flow of pressurized air to the outlet port 232. While in this position, the valve sealing surface 262 is moved away from valve seat 272 so that the outlet port 232 is open and in fluid communication with the exhaust port 248. This allows any pressurized air in the outlet to be vented to the atmosphere through the exhaust port 248. Likewise, the valve sealing surface 260 is moved away from valve seat 270 when the valve member 254 is in an energized position, thereby allowing the flow of pressurized air from the inlet port 230 to the outlet port 232. While in this position, the valve seat 272 provides a sealing contact with the valve sealing surface 262 of the valve element 258 so that the outlet port 232 is closed off from the exhaust port 248 and pressurized air from the inlet port 230 is delivered to the outlet port 232. The exhaust port 248 includes a diffuser assembly 286 that is retained in the valve body 212 so that as pressurized air is allowed to enter the exhaust port 248 it passes through the diffuser assembly 286 prior to venting to the atmosphere. The diffuser assembly 286 is a membrane that allows air to pass but prevents foreign objects from entering the exhaust port 248.

In the preferred embodiment, the actuator assembly 214 is mounted to the top surface 216 of the valve body 212 which allows for the rapid removal and replacement of the actuator assembly 214 from the valve body 212 without having to depressurize the system. It should be appreciated that various other means of attaching the actuating assembly 214 to the valve body 212 are available that provide a like rapid removal and replacement feature. As such, any other known manner of like actuator attachment may be employed without departing from the scope of the invention.

The quick connect fittings 240 and 242 are of a known type of "push-in locking connector" for pneumatic tubing as previously described above. The valve body 212 includes fitting bores 310 and 312 that are each formed to receive the fittings 240. Similarly, the valve body includes a fitting bore 314 to receive fitting 242, which is substantially similar but of slightly smaller size. The quick connect fittings 240, 242 are the same as fitting 40, 42 and so the description of the subcomponents of these elements will not be repeated here.

As best shown in FIGS. 5A–5B, the valve body 212 also includes a latching assembly 330 that is used to releasably mount the valve body 212 to the mounting plate 28 (FIG. 1). The latching assembly 330 extends away from the valve body 212 and has a first flanged lip 332 extending laterally outward from the valve body 212 and a second flanged lip 334 disposed opposite to the first flanged lip 332 on the latching assembly 330. The flanged lip 334 also extends laterally outward from the valve body 212. As in the above described embodiment, the latching assembly 330 here is an integrally formed portion of the valve body 212 that extends away and is spaced apart from the valve body 212. The latching assembly 330 has a first and second flanged lip 332 and 334, which form first and second mounting channels 336 and 338. Likewise, a biasing bore 342 retains a biasing latch member 348. The latching assembly 330 is adapted to engage and be retained in mounting plate 28 in a manner identical to that in which valve assembly 10 is operatively retained within an aperture 140 in the mounting plate 28 and without the use of fasteners, as shown in FIGS. 4A, 4B, and 4C.

The above-described embodiments of the present invention overcome the drawbacks and disadvantages of conventional valve assemblies that require costly amounts of downtime to remove and replace. Specifically, the present invention avoids the current methods of affixing valve assemblies to a mounting plate or attachment surface using a variety of fasteners. Furthermore, the pressurized connections at the inlet, outlet, and pass-through of the present invention do away with the requirement of the use of known, conventional types of threaded fasteners that do not lend themselves to quick mounting or replacement. Therefore, the present invention provides a solenoid actuated pneumatic valve assembly that overcomes these deficiencies by providing the ability to be rapidly and readily removed and replaced.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

We claim:

1. A solenoid actuated pneumatic valve assembly comprising:
    a one piece valve body having:
        a pressurized air supply inlet port adapted to be in fluid communication with a source of pressurized air,
        an outlet port adapted to be in fluid communication with at least one active pneumatically operated device, and
        a pass-through passage in fluid communication with said inlet port and adapted to be in fluid communication with and provide a pass-through of the supply of pressurized air to the inlet port of another valve assembly such that said valves are mounted in series with respect to the supply of pressurized air; and
    a latching assembly integrally created with and extending outwardly from said one piece valve body adapted to engage and be operatively retained within a single aperture in a mounting plate;
    wherein said latching assembly has a first flanged lip extending laterally outward from said valve body and a second flanged lip disposed opposite to said first flanged lip also extending laterally outward from said valve body, said first flanged lip defining a first mounting channel adapted to accept and retain one side of said single aperture in the mounting plate, said second flanged lip defining a second mounting channel adapted to accept the opposite side of the mounting plate aperture, said flanged lips extend beyond the edges of the single mounting plate aperture and affix said valve body to the mounting plate without deflecting either of the first and second flanged lips.

2. A solenoid actuated pneumatic valve assembly as set forth in claim 1 wherein said latching assembly further includes a biasing bore formed within the latching assembly, said biasing bore having an open end proximate to said second flanged lip and a closed end proximate to said first flanged lip, a biasing latch member retained at said closed end of said biasing bore while allowing the opposite end of said biasing latch member to extend beyond said second mounting channel to the edge of said second flanged lip such that when said valve assembly is installed in the mounting plate, said biasing latch member is adapted to provide a biasing force between the edge of the mounting plate aperture at said second mounting channel and said closed end of said biasing bore thereby forcing said first mounting channel of said latching assembly against the edge of the mounting plate aperture to retain said valve assembly without fasteners.

3. A solenoid actuated pneumatic valve assembly as set forth in claim 2 whereas said biasing latch member is a coiled spring.

4. A solenoid actuated pneumatic valve assembly as set forth in claim 1 wherein said valve body further includes a valve bore extending axially within said valve body and a valve member movable between predetermined positions within said valve bore to selectively direct a flow of pressurized air from said inlet port through said valve bore to said outlet port.

5. A solenoid actuated pneumatic valve assembly as set forth in claim 4 wherein said valve member further includes at least one valve element disposed upon said valve member, said at least one valve element having a valve sealing surface.

6. A solenoid pneumatic valve assembly as set forth in claim 5 wherein said valve sealing surface includes an over-molded sealing material disposed on the valve sealing surface and at least one valve seat is defined in said valve bore and is adapted to provide a sealing contact with said valve sealing surface of said valve element when said valve member is in a closed position thereby interrupting said flow of pressurized air.

7. A solenoid actuated pneumatic valve assembly as set forth in claim 5 wherein said valve bore is further defined as having an open end and a closed end, said valve assembly further includes a biasing member of operatively disposed within said valve bore and adapted to provide a biasing force between said closed end of said valve bore and one end of said valve member, such that said valve member is operatively biased in one direction.

8. A solenoid actuated pneumatic valve assembly as set forth in claim 7 wherein said valve assembly further includes a solenoid assembly mounted upon said valve body at said open end of said valve bore opposite said biasing member, said solenoid assembly adapted to selectively actuate said valve member between predetermined positions within said valve bore in a direction opposite to said biasing force of said biasing member to direct the flow of pressurized air within the valve body.

9. A solenoid actuated pneumatic valve assembly as set forth in claim 8 further including at least one exhaust port disposed within said valve body in fluid communication with said valve bore such that said valve element is further operable to selectively direct a flow of pressurized air from said outlet port through said valve bore to said at least one exhaust port.

10. A solenoid actuated pneumatic valve assembly comprising:
a one piece valve body having a pressurized air supply inlet port in fluid communication with a source of pressurized air, an outlet port adapted to be in fluid communication with at least one active pneumatically operated device, and a pass-through port in fluid communication with said inlet port and adapted to be in fluid communication with and provide a pass-through of the supply of pressurized air to the inlet port of at least one other valve assembly mounted in series with respect to the supply of pressurized air; and
a latching assembly integrally created with said one piece valve body that extends away from said valve body and has a biasing member receiving bore separating a first flanged lip extending laterally outward from said valve body and a second flanged lip disposed opposite to said first flanged lip also extending laterally outward from said valve body, said first flanged lip defining a first mounting channel adapted to accept and retain one side of a single aperture in the mounting plate, said second flanged lip defining a second mounting channel adapted to accept the opposite side of the mounting plate aperture, said flanged lips extend beyond the edges of the mounting plate aperture to mount said valve body to the mounting plate.

11. A solenoid actuated pneumatic valve assembly comprising:
a valve body having a pressurized air supply inlet port in fluid communication with a source of pressurized air, an outlet port adapted to be in fluid communication with at least one active pneumatically operated device, and a pass-through port adapted to be in fluid communication with and provide a pass-through of the supply of pressurized air to the inlet port of at least one other valve assembly mounted in series with respect to the supply of pressurized air; and
a latching assembly that extends away from said valve body and has a first flanged lip extending laterally outward from said valve body and a second flanged lip disposed opposite to said first flanged lip also extending laterally outward from said valve body, said first flanged lip defining a first mounting channel adapted to accept and retain one side of an aperture in the mounting plate, said second flanged lip defining a second mounting channel adapted to accept the opposite side of the mounting plate aperture, said flanged lips extend beyond the edges of the mounting plate aperture to mount said valve body to the mounting plate;
wherein said latching assembly further includes a biasing bore formed within the latching assembly, said biasing bore having an open end proximate to said second flanged lip and a closed end proximate to said first flanged lip, a biasing latch member retained at said closed end of said biasing bore while allowing the opposite end of said biasing latch member to extend beyond said second mounting channel to the edge of said second flanged lip such that when said valve assembly is installed in the mounting plate, said biasing latch member is adapted to provide a biasing force between the edge of the mounting plate aperture at said second mounting channel and said closed end of said biasing bore thereby forcing said latching assembly against the edge of the mounting plate aperture at said first mounting channel to retain said valve assembly.

12. A solenoid actuated pneumatic valve assembly as set forth in claim 11 wherein said latching assembly is an integrally formed portion of said valve body that extends away and is spaced apart from said valve body.

13. A solenoid actuated pneumatic valve assembly as set forth in claim 12 wherein said valve body further includes a valve bore defined within said valve body and a valve member movable between predetermined positions within said valve bore to selectively direct a flow of pressurized air from said inlet port through said valve bore to said outlet port.

14. A solenoid actuated pneumatic valve assembly as set forth in claim 13 wherein said valve member further includes at least one valve element disposed upon said valve member, said at least one valve element having a valve sealing surface.

15. A solenoid actuated pneumatic valve assembly as set forth in claim 14 wherein at least one valve seat is defined in said valve bore and is adapted to provide a sealing contact with said valve sealing surface of said valve element when said valve member is in a closed position thereby interrupting said flow of pressurized air through said valve bore.

16. A solenoid actuated pneumatic valve assembly as set forth in claim 15 wherein said valve bore is further includes an open end and a closed end, said valve assembly further includes a biasing member operatively disposed within said valve bore and adapted to provide a biasing force between said closed end of said valve bore and one end of said valve member, such that said valve member is operatively biased in one direction.

17. A solenoid actuated pneumatic valve assembly as set forth in claim 16 further including at least one exhaust port defined within said valve body in fluid communication with said valve bore such that said valve element is operable to selectively direct a flow of pressurized air from said outlet port through said valve bore to said at least one exhaust port.

* * * * *